United States Patent
Tanaka et al.

[11] 3,935,530
[45] Jan. 27, 1976

[54] COMPENSATION EQUIPMENT FOR FLUCTUATIONS IN A.C. SOURCE VOLTAGE

[75] Inventors: Masaru Tanaka; Yoshimitsu Matsumoto, both of Toyonaka; Takeshi Oku, Kawanishi, all of Japan

[73] Assignee: Matsushita Electric Industrial Co., Ltd., Kadoma, Japan

[22] Filed: May 24, 1972

[21] Appl. No.: 256,408

[30] Foreign Application Priority Data
May 26, 1971  Japan.............................. 46-36088
May 26, 1971  Japan......................... 46-42995[U]

[52] U.S. Cl................... 323/19; 219/108; 219/115; 323/24; 323/34
[51] Int. Cl.²............................................ G05F 1/44
[58] Field of Search............. 219/108, 115; 321/16; 323/19, 24, 34, 36, 106, 109, 122, 125, 126, 22 V

[56] References Cited
UNITED STATES PATENTS

| | | | |
|---|---|---|---|
| 2,373,543 | 4/1945 | Cooper | 323/36 X |
| 2,393,884 | 1/1946 | Callender | 323/24 X |
| 2,534,909 | 12/1950 | Hooper | 323/24 X |
| 2,617,977 | 11/1952 | Large | 323/36 X |
| 2,630,557 | 3/1953 | Bixby | 323/22 X |
| 2,727,969 | 12/1955 | Platte | 323/24 X |
| 3,128,422 | 4/1964 | Brown | 323/34 X |
| 3,233,165 | 2/1966 | Bedford | 323/34 X |

*Primary Examiner*—A. D. Pellinen
*Attorney, Agent, or Firm*—Burgess Ryan and Wayne

[57] ABSTRACT

An AC voltage regulator which detects the instantaneous supply voltage in a phase shifter and compares it with the reference voltage by a comparator circuit so that in response to the output signals from the comparator, the firing angle of the thyristors connected to a supply voltage circuit may be controlled in order to maintain constant the effective load current.

4 Claims, 6 Drawing Figures

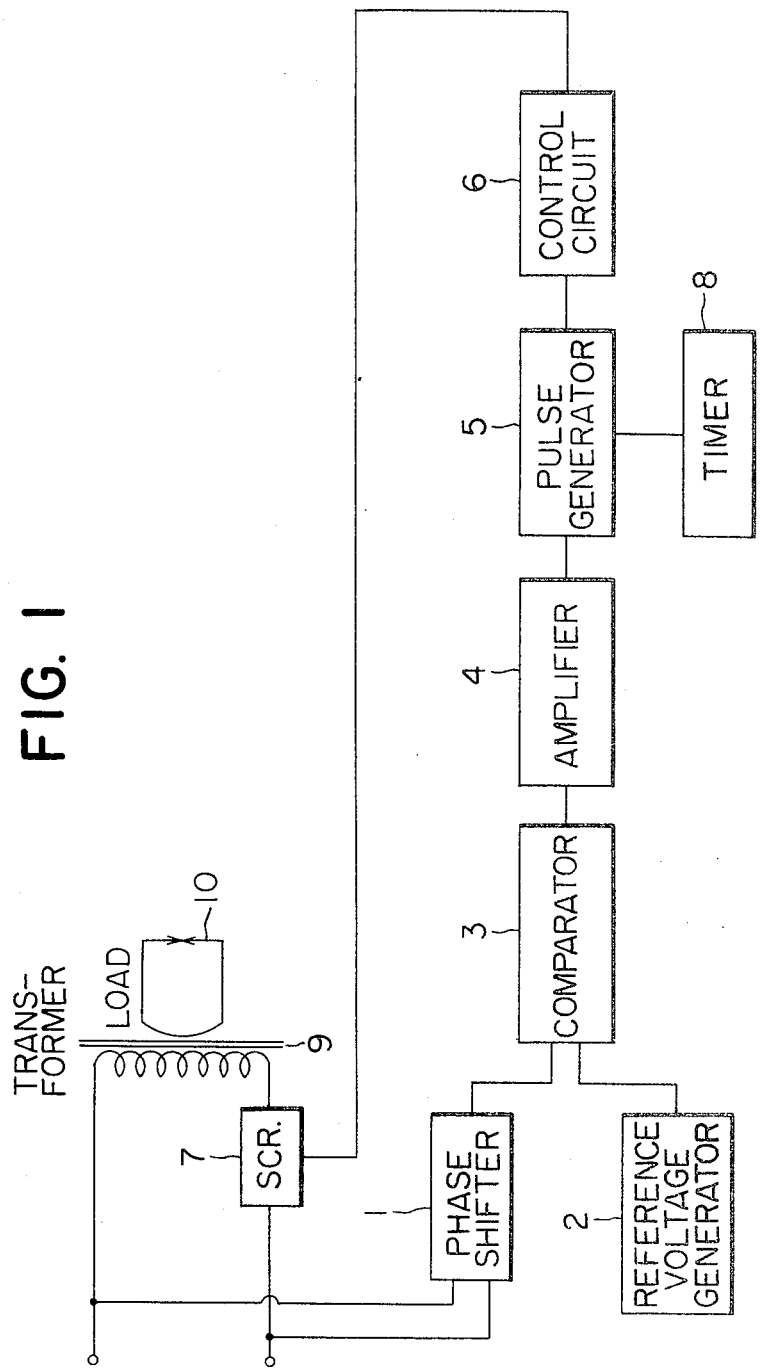

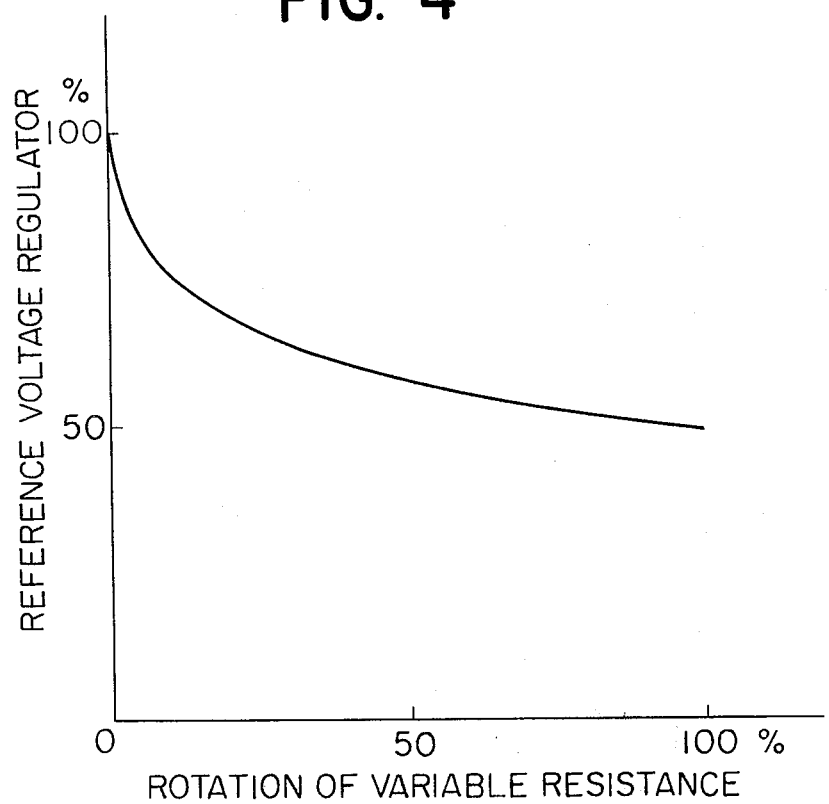

COMPENSATION EQUIPMENT FOR FLUCTUATIONS IN A.C. SOURCE VOLTAGE

BACKGROUND OF THE INVENTION

The present invention relates to a voltage regulator.

In general, the quality of the spot-welded joints are dependent upon the Joule's heat applied to the metal pieces to be welded, that is the total heat generated in the work which is given by (welding current)$^2$ × (resistance of and between the metal pieces to be joined and electrodes) × (time interval, during which the welding current flows).

It is seen from the above relation that the quality of the welded joints is especially dependent upon the welding current, since it is squared, so that when the welding current is maintained constant even if the supply voltage varies, the constant Joule's heat may be produced. Thus the quality of the welded joints may be much enhanced. However, a time interval during which the welding current flows is very short and is of the order to a few cycles to tens of cycles so that no satisfactory feedback can be attained in the closed loop automatic control system because a time interval longer than tens of cycles must be tolerated to respond to the error or variation in supply voltage.

There has been proposed a voltage regulator of the type in which the welding current which is detected by a current transformer, squared, integrated and multiplied by the welding current supply time interval may be maintained constant. However, this voltage regulator is of closed loop type so that no satisfactory result can be attained because of the control time delay. Furthermore, the voltage regulator of the type described is complex in circuitry and very expensive to manufacture so that it is not feasible in practice.

SUMMARY OF THE INVENTION

One of the objects of the present invention is therefore to provide a voltage regulator of the type capable of maintaining constant the load current regardless of the variation in supply voltage by maintaining constant the effective load current.

Another object of the present invention is to provide a voltage regulator of the type overcoming the problem of the time lag in voltage regulation encountered in the prior art apparatus.

Another object of the present invention is to provide a voltage regulator which is simple in circuitry and inexpensive to manufacture.

Briefly stated, the voltage regulator in accordance with the present invention is of open loop system. The phase of the supply voltage is advanced by a phase shifter, and the instantaneous supply voltage is detected. When the supply voltage is lower than a rated voltage, the firing angle of the SCR connected in series to a supply voltage circuit is increased. On the other hand, when the supply voltage is lower than the rated voltage, the firing angle is decreased. Thus, the effective voltage across the primary winding of a welding transformer may be always maintained constant.

The above and other objects, features and advantages of the present invention will become more apparent from the following description of one preferred embodiment thereof taken in conjunction with the accompanying drawing.

BRIEF DESCRIPTION OF THE DRAWING

FIG. 1 is a block diagram of one preferred embodiment of the voltage regulator in accordance with the present invention;

FIG. 4 is a graph illustrating the characteristic curve of a control circuit in the apparatus shown in FIG. 3.

DESCRIPTION OF THE PREFERRED EMBODIMENT

Figure 2A:
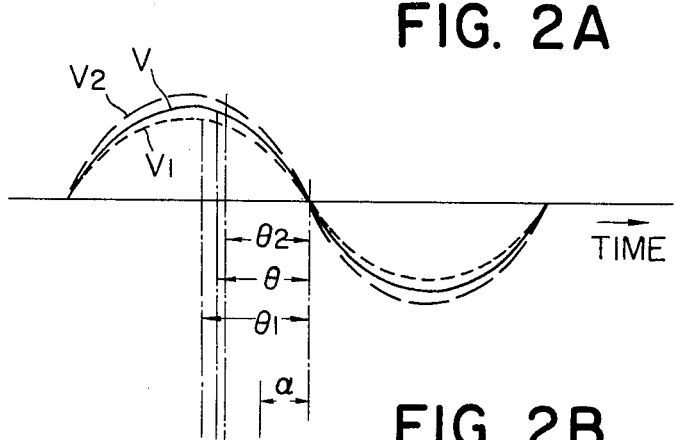
FIG. 2 is a view used for explanation of the underlying principle of the present invention.

Referring to FIG. 1 illustrating in block diagram the first embodiment of the present invention the voltage regulator generally comprises a phase shifter 1 for detecting the magnitude of a voltage supplied from a power source, a reference voltage generator 2, a comparator 3 for comparating the output voltage of the phase shifter 1 with the reference voltage derived from the reference voltage generator 3, an amplifier 4 for amplifying the output signals from the comparator 3, a pulse generator for converting the signals from the amplifier 4 into the pulse signals, a control circuit 6 for controlling a SCR circuit 7, a timer 8 which generates the welding current supply signal so that when the timer 8 is not actuated, no pulse output is derived from the pulse generator 5, a welding transformer 9 and a load 10 in welding operation.

Next referring to FIG. 2A, it is assumed that the welding current $i$ flows through an angle $\theta$ at a rated voltage $v$. When the voltage drops to $v_1$, the firing angle $\theta_1$ is so determined that the welding current $i_1$ has the same effective magnitude with that of the welding current $i$. In a similar manner, when the voltage rises to $v_2$, the firing angle $\theta_2$ is so determined that the welding current $i_2$ may have the same effective magnitude with that of the welding current $i$.

Figure 2B:
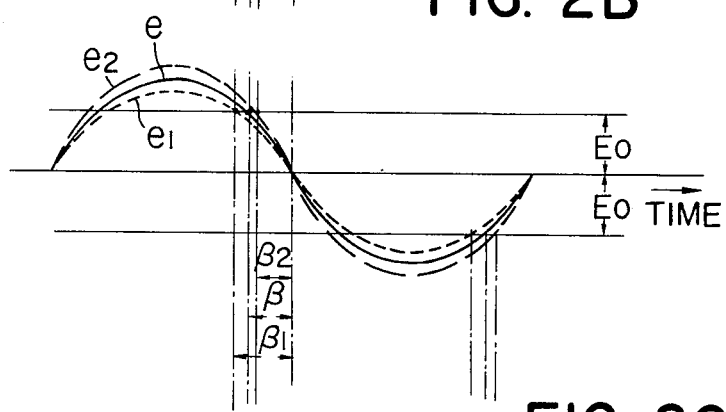

Next as shown in FIG. 2B, the output voltage of the phase shifter 1 is so controlled as to lead by $\alpha$ with respect to the supply voltage and to have the magnitudes $e$, $e_1$ and $e_2$ in proportion to the variation in supply voltage $v$, $v_1$ and $v_2$. The angle of lead $\alpha$ and the reference voltage $Eo$ are so determined that the following relations may be held:

| Source voltage | |
|---|---|
| $v$ | $\alpha + \beta = \theta$ |
| $v_1$ | $\alpha + \beta_1 = \theta_1$ |
| $v_2$ | $\alpha + \beta_2 = \theta_2$ |

Figure 2C:
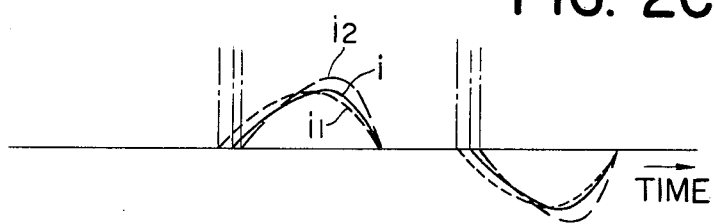

And the pulses are generated when the waveforms of the output voltages $e_1$, $e_2$ and $e_3$ of the phase shifter 1 intersect the reference voltage levels $Eo$ to control the firing angles of the SCR so that the welding current may be maintained constant as shown in FIG. 2C. More particularly, when the supply voltage drops to $v_1$, the firing angle of the SCR 7 is increased to $\theta_1$ whereas the supply voltage rises to $v_2$, the firing angle is decreased to $\theta_2$. Hence the effective value of the welding current may be maintained always constant regardless of the variation in supply voltage.

Figure 3:
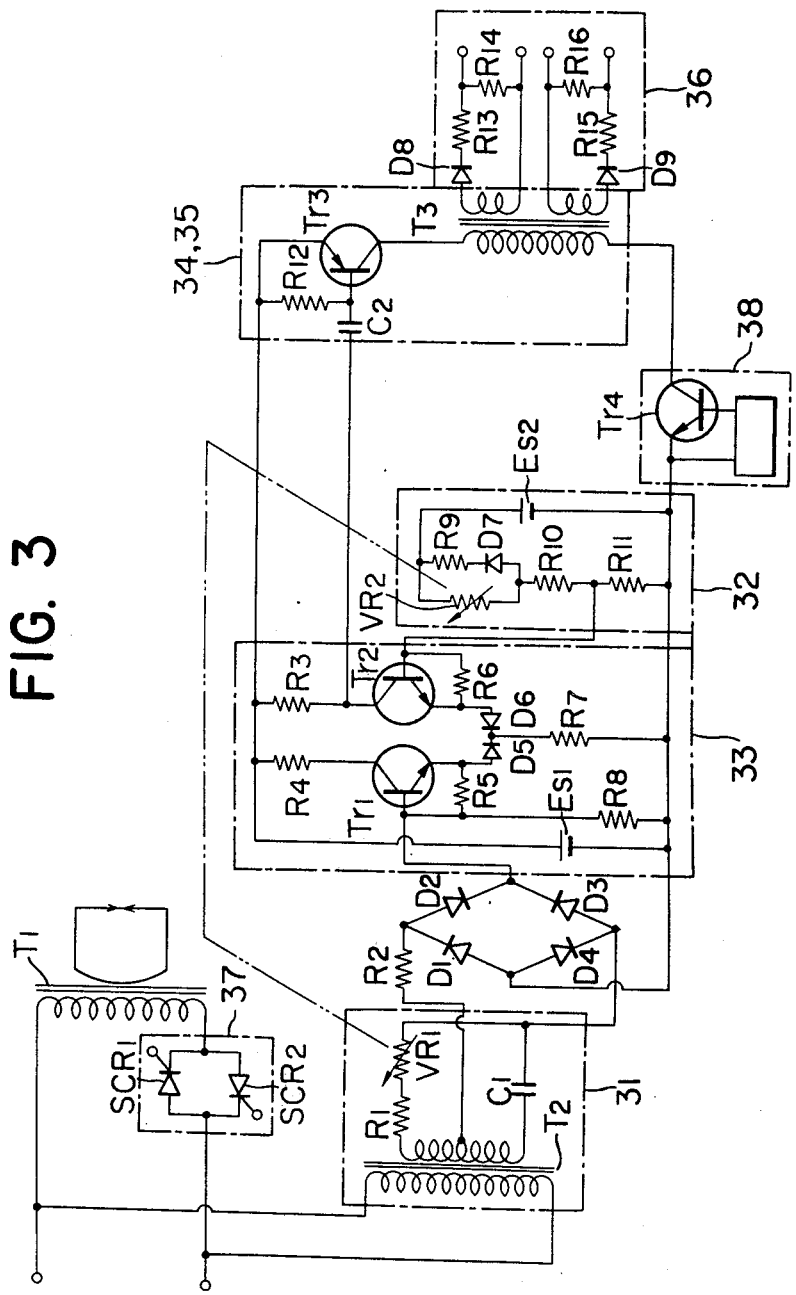
FIG. 3 is a practical electric circuit diagram of the preferred embodiment shown in FIG. 1.

Next when a greater welding current is required, it is assumed that the firing angle of the SCR 7 is increased to $\theta_a$ at which the required welding current may be derived at the rate supply voltage $v$. It is further assumed that the welding current $i_a$ be constant when the firing angle is $\theta_a$ for the supply voltage $v$, $\theta_{1a}$ for $v_1$, and $\theta_{2a}$ for $v_2$. However, when the phase shift attained by the phase shifter 1 is fixed, the above firing angles $\theta_{1a}$ and $\theta_{2a}$ cannot be attained even if the reference voltage $Eo$ is varied. Similarly, these firing angles cannot be attained even when the phase shift by the phase shifter 1 is varied while the reference voltage $Eo$ remains unchanged. The experiments conducted by the inventors showed that when the welding current is varied, its effective value cannot be maintained at the same level when the supply voltage varies if both the phase and the reference voltage $Eo$ are varied simultaneously. In view of the above, according to the present invention, a first variable resistor in the phase shifter 1 gangs with a second variable resistor in the reference voltage generator 2 for adjusting the reference voltage so that the constant effective welding current may be derived even when the welding current setting is varied. This will be described in more detail with reference to FIG. 3 illustrating the practical electric circuit diagram of the voltage compensator in accordance with the present invention.

The voltage regulator generally comprises a phase shifter generally designated by 31, a reference voltage generator 32, a comparator 33, amplifier 34, pulse generator 35, a SCR firing circuit 36, a SCR circuit 37, and an electronic timer circuit 38.

The phase shifter circuit 31 comprises a transformer $T_2$, a variable resistor $VR_1$, a fixed resistor $R_1$, and a capacitor $C_1$. The phase of the output voltage of the phase shifter 31 may be varied with respect to that of the supply voltage by adjusting the variable resistor $VR_1$. The fixed resistor $R_1$ is inserted so that the phase of the output voltage will not lead a predetermined phase. The output voltage of the phase shifter 31 is rectified by a diode bridge rectifier $D_1$–$D_4$ inserted between the phase shifter 31 and the comparator 33. A fixed resistor $R_2$ serves to limit the current flow.

The reference voltage generator circuit generally designated by 32 comprises a DC power source $E_{s2}$, a constant voltage diode $D_7$, fixed resistors $R_9$, $R_{10}$ and $R_{11}$, and a variable resistor $VR_2$ which is ganged with the variable resistor $VR_1$ in the phase shifter 31. As described above, the experiments showed that the voltage at the resistor wiper arm or the like must be a particular nonlinear function of shaft rotation of the variable resistors $VR_1$ and $VR_2$ as shown in FIG. 4 in order that the effective welding current may be held constant regardless of the variation in supply voltage. That is, when the shaft rotation of the variable resistor $VR_2$ is 0% (the full rotation being 100%), the full voltage of the DC power source $Es_2$ is applied across the series-connected resistors $R_{10}$ and $R_{11}$, and as the shaft rotates the current starts to flow through the constant voltage diode $D_7$ so that the characteristic curve shown in FIG. 4 may be obtained. Hence even when the welding current setting is varied, the constant effective welding current may be maintained even if the supply voltage varies because of the provision of the ganged resistors $VR_1$ and $VR_2$.

Next the voltage comparator circuit generally denoted by 33 comprises transistors $Tr_1$ and $Tr_2$, diodes $D_5$ and $D_6$, fixed resistors $R_3$–$R_8$, and a DC power source $Es_1$. The comparator 33 is of a difference amplifier type, and the full-wave-rectified output voltage of the phase shifter 31 is compared with the output voltage of the reference voltage generator circuit 32 so that the output voltage of the comparator 33 is applied through a capacitor $C_2$ to the base of a transistor $Tr_3$. It is seen that the differentiated current signal is applied to the base of the transistor $Tr_3$ because the capacitor $C_2$ and a fixed resistor $R_{12}$ constitute a differentiation circuit. As a result, a pulse voltage is induced across the secondary of a transformer $T_3$.

The SCR firing circuit generally denoted by 36 comprises diodes $D_8$ and $D_9$, and fixed resistors $R_{13}$–$R_{16}$. The resistor $R_{14}$ is interconnected between the gate and cathode of $SCR_1$ whereas the resistor $R_{16}$ between those of $SCR_2$.

The SCR circuit 37 comprises two SCRs, $SCR_1$ and $SCR_2$, and is coupled to the welding transformer $T_1$.

The timer circuit 38 comprises transistor $Tr_4$ which is conducted in response to the signal applied to the base thereof so that the output voltage may be derived from the pulse transformer $T_3$.

In the instant embodiment, the differential amplifier is used as the comparator, but it should be understood that any other suitable comparator may be employed such as a comparator comprising diodes. Instead of the SCRs, ignitrons may be employed. It should be noted that the underlying principle of the present invention may be also applied to an AC voltage regulator or the like.

According to the present invention, the effective voltage applied across the primary of the welding transformer may be always maintained constant regardless of the variation in supply voltage. Therefore, the quality of the welded joints may be maintained at the same reliable level. Since the phase shifter is provided, the instantaneous magnitude of the supply voltage may be detected to regulate the output voltage without any time delay. Thus, the precise voltage regulation may be accomplished, and the welding quality may be further improved. The welding current setting may be easily adjusted with only one vernier dial so that the voltage regulator in accordance with the present invention may be advantageously operated even by an unskilled operator. The voltage regulator in accordance with the present invention is simple in construction, compact in size and reliable and dependable in operation.

What is claimed is:

1. An AC voltage regulator for regulating voltage applied to a load from a source of an AC supply voltage, comprising a phase shifter for advancing the phase of said supply voltage;

a reference voltage generator for generating a reference voltage for comparison with the output voltage of said phase shifter;

a comparator for comparing the instantaneous output voltage of said phase shifter with the reference voltage derived from said reference voltage generator; and an SCR firing angle control circuit is connected in series to supply voltage from said source to said load in response to the output signals from said comparator;

whereby the SCR firing angle may be controlled so as to maintain constant the effective load current regardless of said supply voltage.

2. An AC voltage regulator as set forth in claim 1 wherein said phase shifter comprises a variable resistor for shifting the phase of the output voltage thereof said reference voltage generator comprises a variable resistor for adjusting the reference voltage, said variable resistors being ganged together so that the resistances of said two variable resistors may be varied simultaneously.

3. An AC voltage regulator for regulating voltage applied from an AC voltage source to a load circuit, comprising phase shifting means connected to said source for providing an AC voltage of a phase leading the phase of said source, a source of a DC comparison voltage, comparator means connected to compare the instantaneous amplitude of said phase shifted AC voltage with said DC voltage for producing a control signal during each cycle of said phase shifted AC voltage, means comprising a firing angle control circuit connected to apply AC voltage from said source to said load circuit, and means applying said control signal to said control circuit for maintaining the effective load current constant independently of said supply voltage.

4. The voltage regulator of claim 3 wherein said phase shifting means comprises a first variable resistor for shifting the phase of the output voltage thereof, said source of a DC comparison voltage comprises a second variable resistor for varying the amplitude of said comparison voltage, and means mechanically coupling said first and second variable resistors for simultaneous control.

* * * * *